United States Patent Office 2,719,801
Patented Oct. 4, 1955

2,719,801

ARC WELDING COMPOSITIONS

Leonidas Keever Stringham, Shaker Heights, and Paul E. Jerabek, Euclid, Ohio, assignors to The Lincoln Electric Company, Cleveland, Ohio, a corporation of Ohio No Drawing. Application September 5, 1951,
Serial No. 245,258

5 Claims. (Cl. 148—26)

The present invention, relating as indicated to compositions for use in arc welding, has more particular regard to so-called flux compositions designed to be placed on the work in the course of an arc welding operation in order to provide a protective blanket over the pool of molten metal which results from such operation.

Until recently, preformed or prefused silicate compounds such as the manganese silicate disclosed in Patent No. 1,754,566 to W. B. Miller, dated April 15, 1930, have been found most satisfactory for the purpose indicated. While this patent also suggests that instead of preformed manganese silicate, a welding composition containing material adapted to react at the temperature of the metal-depositing operation to produce manganese silicate, such a simple intermixture of the ingredients, particularly where certain desirable additives are included, has never been found satisfactory in use.

However, there has more recently been perfected an improved flux composition as disclosed in Patent No. 2,474,787 to G. G. Landis et al., dated June 28, 1949, in which the flux ingredients, consisting essentially of one or more metallic oxides and silica in amount approximately that required to combine with such oxides to form corresponding silicates, are agglomerated by means of a suitable binder, e. g. substantially anhydrous water glass, in uniformly distributed condition throughout granular free-flowing particles which form the welding material. The advantages of thus employing the foregoing, together with other essential ingredients of the composition in uncombined or unreacted form, instead of prefusing such ingredients so as to complete all reactions therebetween before use in welding, are fully pointed out in such last cited patent.

We have now discovered that similar, if not greater, advantages are obtained by thus agglomerating reacting ingredients which, when reacted by interfusion during the welding operation, form not a metallic silicate, but form other compounds, for example aluminates.

One principal object of the present invention is to reduce the amount of manganese (in the form of manganese oxide) required, since this metal has other important metallurgical uses and is frequently in scarce supply. Furthermore, we have found it possible not merely to reduce substantially the amount of silica below the combining ratio which would be required to form silicates with the metallic oxides, i. e. so-called basic ingredients, present, but to omit silica entirely as a separate ingredient. Instead we introduce a sufficient amount of alumina, or of zircon, to combine not only with manganese oxide, but also with another principal constituent in our flux, viz. magnesia (magnesium oxide), or its equivalent, lime (calcium oxide).

In addition to the foregoing special objectives, we achieve the following generally desirable characteristics in a composition of the type in question, viz. that, when fused, it should not be too fluid, that it will set up quickly, i. e. solidify at a higher temperature; and that, after solidification, the resulting slag layer will be easily removable. In addition, the present improved composition can be made at substantially lower cost than any currently available.

The following description accordingly sets forth in detail certain products and methods for making the same which exemplify the present improvements; such disclosed products and procedures however constituting only several of the various applications of the principle of the invention.

It will be understood that the several ingredients already indicated as entering into our improved flux composition, and hereinafter more particularly described, are present as such in said composition. In other words, these principal ingredients, together with certain additives which will likewise be set forth in detail, are not interfused or otherwise caused to react, but are agglomerated, substantially in the manner taught by the above-cited Patent No. 2,474,787, to form granular free-flowing particles. Accordingly, in the several examples which follow it will be understood that the materials listed represent the actual materials and not the results of a chemical analysis of a compound resulting from interfusion of said ingredients or their reaction however produced.

It will further be noted that in each of the following examples the indicated amount of the binding agent, viz. sodium silicate, is the amount of such agent in the water-dissolved form used in making up the mixture prior to the drying of the latter.

The following will indicate generally the ingredients and the preferred range thereof which may be used in making up our present improved arc welding composition, viz.:

| | |
|---|---|
| Manganese ore (MnO) | From 5 to 15% |
| Alumina ($Al_2O_3$) | From 15 to 30% |
| Zircon (zirconium orthosilicate) | From 0 to 15% |
| Magnesia (MgO) | From 15 to 25% |
| Silica ($SiO_2$) | From 15 to 25% |
| Fluorspar ($CaF_2$) | From 4 to 6% |
| Killing agent (silico-manganese) | From 2½ to 5% |
| Sodium silicate (43% solid) | From 10 to 18% |

Referring to the foregoing table, it should be explained that the term "manganese ore" is intended to connote not merely the several forms of manganese oxide which are available in the form of a naturally ocurring mineral, but also various forms of manganese oxide which are obtained as the result of processing other ores. Also while in said table the formula MnO is employed to indicate the chief component of such ore, it will be understood that the latter may consist to a greater or less extent of other oxides of manganese. Of course where the ore used is a naturally occuring mineral, depending upon the degree of refinement thereof it will always contain certain impurities in minor amount, e. g. silica or alumina, either in free or combined form.

It should be further explained that in the foregoing formula the manganese ore and magnesia may be regarded as so-called basic ingredients, either of which may be reduced in amount provided there is a corresponding increase in the amount of the other. Similarly, the alumina and silica constitute so-called acidic ingredients, the total amount of which should balance the total amount of such basic ingredients; however, as pointed out above, we have found that by compounding the several ingredients in the manner described, the alumina may substantially, in fact entirely, displace the silica in the composition.

The following is an example of a specific composition made according to the foregoing general formula which has been found highly satisfactory in commercial arc welding, viz.:

Example 1

| | Per cent |
|---|---|
| Manganese ore (MnO) | 10 |
| Alumina (Al₂O₃) | 20.5 |
| Zircon (zirconium orthosilicate) | 5 |
| Magnesia (MgO) | 20 |
| Fluorspar | 5 |
| Silica (SiO₂) | 20 |
| Killing agent (silico-manganese) | 4.5 |
| Sodium silicate (43% solid) | 15 |
| Total | 100.0 |

The following slightly variant form of the example just given has also proved entirely satisfactory in commercial welding, viz.:

Example 2

| | Per cent |
|---|---|
| Manganese ore (MnO) | 12 |
| Alumina (Al₂O₃) | 28 |
| Zircon (zirconium orthosilicate) | 13 |
| Magnesia (MgO) | 17 |
| Silica (SiO₂) | 5 |
| Fluorspar | 4 |
| Killing agent (silico-manganese) | 5 |
| Sodium silicate (43% solid) | 16 |
| Total | 100 |

Still other examples of compositions which have proven satisfactory upon test follow, viz.:

Example 3

| | Per cent |
|---|---|
| Manganese ore (MnO) | 10 |
| Alumina (Al₂O₃) | 25 |
| Zircon (zirconium orthosilicate) | 5 |
| Magnesia | 19.7 |
| Silica | 15 |
| Fluorspar | 5 |
| Silico-manganese | 2.5 |
| Ferro-silicon (50% grade) | 0.8 |
| Sodium silicate (57% H₂O) | 17 |
| Total | 100.0 |

Example 4

| | Per cent |
|---|---|
| Manganese ore (MnO) | 12 |
| Alumina (Al₂O₃) | 28 |
| Zircon (zirconium orthosilicate) | 7 |
| Diopside (calcium-magnesium meta-silicate) | 30 |
| Fluorspar | 4 |
| Killing agent (silico-manganese) | 4 |
| Sodium silicate (43% solid) | 15 |
| Total | 100 |

In preparing our improved flux composition using any of the foregoing formulas, all of the ingredients with the exception of the sodium silicate are employed in dry finely ground state and are thoroughly intermixed either before or incidentally to the addition of the sodium silicate solution. Thereupon the whole is dried at a suitable temperature to a point where the water content is reduced to ½% or less, following which the resulting agglomerated mass is crushed to approximately 12 x 120 mesh.

The temperature employed in thus driving off the water may vary, with a corresponding variation in the time factor, so long as it is held substantially below that at which interfusion of the ingredients will occur. In other words, no attempt is made to sinter the mixture, much less to form a synthetic metal silicate of these components, but merely to bind together the fine particles comprising the mixture into uniform conglomerate mixture, in which the dried sodium silicate serves as the binding agent. It will be understood that potassium silicate may be utilized equally well as a binder, and it, together with such sodium silicate, are inclusively designated herein by the term "water glass." A temperature of from 1400° F. to 1600° F. has been found a satisfactory one to which to heat the mixture, where, as preferred, such heating is carried out in a rotary kiln. By properly regulating the rate of flow of the material through the kiln the drying operation will proceed gradually and at a sufficiently rapid rate for commercial production. Furthermore, by drying the material in such rotary kiln it has been found that a substantial proportion thereof will be discharged already in granular form of desired particle size and thus reduce the amount of the material which will need to be crushed to obtain such particle size. While some of the particles will be too fine for satisfactory use as a welding composition, these can be screened out and agglomerated into larger particles by passing the same through the kiln a second time.

As indicated in the examples given above, the manganese oxide employed will ordinarily be manganese ore either in the form of the naturally occurring mineral or such mineral which has been processed as by roasting in order to reduce the available oxygen and otherwise condition such ore for its intended use. Such ore, as is well known, consists in major proportion of manganese dioxide together with a small amount of other compounds, e. g. silica, pyrite, etc., as impurities.

The silico-manganese or ferro-silicon included in the examples set forth above is what is known as a "killing agent" in steel making, and the amount thereof may be slightly more or less than the percentage indicated. Also other similar alloys may be utilized.

Where, as in Examples 1, 2 and 3 above, magnesia is listed as one of the ingredients, it will be understood that in commercial manufacture what is employed will ordinarily be burnt magnesite, the magnesia (MgO) content of which is somewhat less than 100% and this may make desirable a corresponding slight modification in the proportion used.

It will be understood that in the dried, finished product the agglomerated particles will contain the ingredients listed in the several examples given above in slightly different proportion owing to the elimination of the water content introduced in the form of the sodium silicate binder. However the percentage of such ingredients can be readily determined by calculation. In this connection, it should be explained that in place of using such water glass as the binder, either anhydrous sodium silicate, sodium hydroxide or sodium carbonate may be substituted, in which latter case there should be sufficient free silica present to react with such carbonate to form sodium silicate in situ when the mixture is heated. In order to effect such reaction it may be necessary to employ a somewhat higher temperature, e. g. approximately 1800° F., instead of the temperature range given above for drying the mixture where water glass is used as the binder. However in all cases the amount of the binder in the final product should be the minimum required to agglomerate the flux ingredients proper in uniformly distributed condition in the particles.

From the foregoing it will be seen that our present improved flux composition instead of being characterized by having a major proportion of a metal silicate, or components which form such silicate when subjected to the heat of the arc in the welding operation, is made up principally of metal aluminate forming components, the latter being in excess of such metal silicate forming components.

The effect of the substantial elimination of water from the dried, agglomerated particles that constitute the finished product, will be represented by the following formula which corresponds with the general formula first given above, viz.:

| | |
|---|---|
| Manganese ore (MnO) | From 5.3 to 16.7% |
| Alumina (Al₂O₃) | From 15.9 to 33.4% |
| Zircon (zirconium orthosilicate) | From 0 to 16.7% |
| Magnesia (MgO) | From 15.9 to 27.9% |
| Silica (SiO₂) | From 15.9 to 27.9% |
| Fluorspar (CaF₂) | From 4.2 to 6.7% |
| Killing agent (silico-manganese) | From 2.7 to 5.6% |
| Sodium silicate (anhydrous) | From 4.3 to 7.8% |

Similarly the following represents the finished product where the ingredients of Example 1 are employed, viz.:

| | Per cent |
|---|---|
| Manganese ore (MnO) | 11.0 |
| Alumina (Al₂O₃) | 22.5 |
| Zircon (zirconium orthosilicate) | 5.5 |
| Magnesia (MgO) | 22.0 |
| Fluorspar | 22.0 |
| Silica (SiO₂) | 5.5 |
| Killing agent (silico-manganese) | 5.0 |
| Sodium silicate (anhydrous) | 6.5 |
| Total | 100 |

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A flux composition suitable for use in arc welding when deposited as a layer in the form of granular free-flowing particles consisting of the following ingredients in approximately the indicated percentages, viz.:

| | |
|---|---|
| Manganese ore (MnO) | From 5.3 to 16.7% |
| Alumina (Al₂O₃) | From 15.9 to 33.4% |
| Magnesia (MgO) | From 15.9 to 27.9% |
| Silica (SiO₂) | From 15.9 to 27.9% |
| Fluorspar (CaF₂) | From 4.2 to 6.7% |
| Killing agent (silico-manganese) | From 2.7 to 5.6% |
| Sodium silicate (anhydrous) | From 4.3 to 7.8% | said ingredients being in finely ground state and agglomerated in uniformly distributed condition into granular free-flowing particles by means of such anhydrous sodium silicate.

2. A flux composition suitable for use in arc welding when deposited as a layer in the form of granular free-flowing particles consisting of the following ingredients in approximately the indicated percentages, viz.:

| | Per cent |
|---|---|
| Manganese ore (MnO) | 11.0 |
| Alumina (Al₂O₃) | 22.5 |
| Zircon (zirconium orthosilicate) | 5.5 |
| Magnesia (MgO) | 22.0 |
| Fluorspar | 5.5 |
| Silica (SiO₂) | 22.0 |
| Killing agent (silico-manganese) | 5.0 |
| Sodium silicate (anhydrous) | 6.5 |
| Total | 100 | said ingredients being in finely ground state and agglomerated in uniformly distributed condition into granular free-flowing particles by means of such anhydrous sodium silicate.

3. The combination of claim 1 wherein said ingredients also include zircon (zirconium orthosilicate) in amounts up to 16.7 per cent.

4. A granular flux composition for arc welding of the type to be deposited in a pile on a seam to be welded, consisting of about 15 to 30% by weight of aluminum oxide; about 2 to 5% by weight of a killing agent selected from the group consisting of silico-manganese and ferrosilicon; about 5 to 15% by weight of manganese oxide; about 4 to 6% by weight of fluorspar; about 10 to 18% by weight of a binder selected from the group consisting of potassium silicate and sodium silicate; and the remainder being magnesium oxide in amounts of from 5 to 25% and silicon dioxide in amounts of 5 to 25%, all of said ingredients being finely ground and agglomerated in uniformly distributed condition into granular, free-flowing particles by means of said binder.

5. The combination of claim 4 wherein said remainder also includes up to 15% zircon.

References Cited in the file of this patent

UNITED STATES PATENTS

| | | |
|---|---|---|
| 1,754,566 | Miller | Apr. 15, 1930 |
| 2,043,960 | Jones | June 9, 1936 |
| 2,164,775 | Miller | July 4, 1939 |
| 2,200,737 | Clapp | May 14, 1940 |
| 2,308,194 | Miller | Jan. 12, 1943 |
| 2,432,773 | Lee | Dec. 16, 1947 |
| 2,435,852 | Stringham | Feb. 10, 1948 |
| 2,474,787 | Landis et al. | June 28, 1949 |
| 2,481,479 | Ter Berg et al. | Sept. 6, 1949 |
| 2,544,334 | Linnert | Mar. 6, 1951 |
| 2,547,432 | Andrews | Apr. 3, 1951 |